Patented Oct. 4, 1932

1,881,236

UNITED STATES PATENT OFFICE

KARL MIESCHER AND ERNEST URECH, OF BASEL, SWITZERLAND, ASSIGNORS TO THE FIRM SOCIETY OF CHEMICAL INDUSTRY IN BASLE, OF BASEL, SWITZERLAND

BASIC ETHERS OF THE PYRIDINE SERIES

No Drawing. Application filed July 28, 1930, Serial No. 471,415, and in Switzerland August 10, 1929.

The present invention relates to new basic ethers of the pyridine series useful in therapeutics.

It has been found that basic ethers of the pyridine series are obtained by causing reactive esters of amino-alcohols to act on hydroxy-pyridines or the nuclear substitution products thereof, or amino-alcohols to act on halogen-pyridines or the substitution products thereof, or amines to act on halogen-alkoxy-pyridines or the substitution products thereof. These reactions are carried out preferably in presence of an agent that binds acids.

As reactive esters of amino-alcohols may be used, for example, aminoalkylesters of hydrohalogenic acids or of aromatic sulfo acids.

The new bases combine with acids to salts soluble in water. They may be employed as such or as intermediate products for therapeutical purposes.

The following examples illustrate the invention, the parts being by weight:

Example 1

A solution of 2.8 parts of sodium in 80 parts of diethylaminoethanol is mixed with 11.3 parts of 2-chloro-pyridine and heated on the oil-bath. After the reaction is complete, the amino-alcohol in excess is distilled off, the residue taken up with ether, and by expulsion of the solvent the new base is isolated. The 2-diethylaminoethoxypyridine of the formula

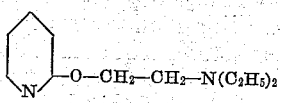

thus obtained is a colorless oil of boiling point 98–100° C. at 2 mm. pressure. It is sparingly soluble in water, but easily soluble in organic solvents and acids. The colorless mono-hydrochloride of the base melts at 135° C. In place of 2-chloropyridine also 2-bromo- or 2-iodo-pyridine may be used.

Example 2

46.4 parts of the sodium salt of 2-pyridine are heated in a solution of toluene with 70 parts of chlorethyldiethylamine until the reaction is complete. The solvent is expelled and the 2-diethylaminoethoxypyridine separated from the N-diethyl-aminoethyl-2-pyridine simultaneously formed by fractionating. It shows the same properties as indicated in Example 1.

Example 3

27 parts of 2-chloro-3-pyridine-carboxylic acid-phenetidide are added to a solution of 2.6 parts of sodium in an excess of diethylaminoethanol and the mixture is heated on the oil-bath. After the separation of the sodium chloride, the excess of the base is distilled off, the residue dissolved in ether, the solution filtered, and the ether expelled. The remaining 2-diethylaminoethoxy-3-pyridine-carboxylic acid-phenetidide of the formula

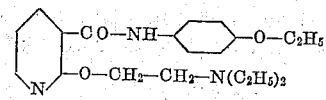

is recrystallized from petroleum ether. It is obtained in colorless crystals melting at 63° C. The monohydrochloride melts at 163° C. It is easily soluble in water.

The 2-chloro-3-pyridine-carboxylic acid-phentidide of melting point 115° C. is obtained by causing phenetidine to react on 2-chloro-3-pyridine-carboxylic acid-chloride. The 2-chloro-3-pyridine-carboxylic acid-chloride is formed by treatment of one molecular proportion of 2-hydroxy-3-pyridine-carboxylic acid with 2 molecular proportions of phosphorous pentachloride. It forms colorless crystals. The melting point is 56° C. and the boiling point 98–100° C. at 2 mm. pressure.

Example 4

2.8 parts of sodium dissolved in an excess of aminoethanol and 23 parts of 2-chloro-3-pyridine-carboxylic acid-anilide are heated on the oil-bath. After separation of the sodium chloride, the excess of aminoethanol is distilled off. The residue is taken up in ethyl acetate and the 2-aminoethoxy-3-pyridine-carboxylic acid-anilide of the formula

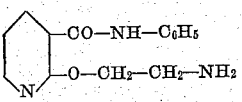

precipitated as monohydrochloride by means of alcoholic hydrochloric acid. It forms white crystals of melting point 203° C. and is easily soluble in water.

2-chloro-3-pyridine-carboxylic acid-anilide may be obtained by the reaction of 2-chloro-3-pyridine-carboxylic acid-chloride on aniline. It forms colorless crystals of melting point 125° C.

*Example 5*

23 parts of pulverised sodium, 120 parts of diethylaminoethanol and 500 parts of toluene are heated on the water-bath until all sodium is dissolved. After addition of 113.5 grams of 4-chloropyridine, the whole is boiled for some hours in a reflux apparatus. The cooled toluene solution is extracted with dilute hydrochloric acid and from the aqueous solution the new base is precipitated by means of a caustic soda solution. It is taken up in ether, dried with potassium carbonate and, after evaporation of the ether, distilled in a high vacuum. The 4-diethylaminoethoxy-pyridine thus formed of the formula

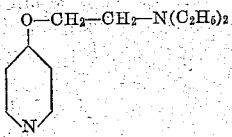

boils at 95° C. at 0.03 mm. pressure. It forms a colorless oil, easily soluble in water.

*Example 6*

2.8 parts of sodium dissolved in an excess of diethylaminoethanol, and 23 parts of 2-chloro-5-pyridine-carboxylic acid-anilide are heated on an oil-bath. After separation of the sodium chloride the excess of diethylaminoethanol is distilled off. The residue is recrystallized from ligroine. There is thus obtained the 2-diethylaminoethoxy-5-pyridine-carboxylic acid-anilide of the formula

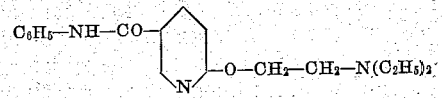

in colorless crystals of melting point 76–77° C. With hydrochloric acid it forms a neutral salt which is easily soluble in water.

The 2-chloro-5-pyridine-carboxylic acid-anilide is obtained by causing 2-chloro-5-pyridine-carboxylic acid-chloride to react with aniline. It forms colorless crystals of melting point 171–172° C.

The 2-chloro-5-pyridine-carboxylic acid-chloride is formed by the interaction of 2 molecular proportions of phosphorous pentachloride and 1 molecular proportion of 2-hydroxy-5-pyridine-carboxylic acid. It distils at 85° C. at 3 mm. pressure and forms colorless crystals of melting point 49–51° C.

*Example 7*

2.5 parts of sodium dissolved in an excess of diethanolamine, and 23 parts of 2-chloro-3-pyridine-carboxylic acid-anilide are heated on an oil-bath. After separation of the sodium chloride the excess of the base is distilled off. The residue is extracted with anhydrous alcohol. After evaporation of the alcohol the 2-(N-hydroxyethylaminoethoxy)-3-pyridine-carboxylic acid-anilide of the formula

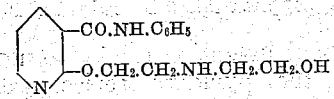

is obtained as a yellowish oil, easily soluble in cold, but with difficulty soluble in warm water. The picrate of the base melts at 206–208° C.

*Example 8*

2.3 parts of pulverised sodium are heated on the water-bath with 5.5 parts of diethanolamine dissolved in 75 parts of toluene, until all sodium has gone into solution. After addition of 23 parts of 2-chloro-3-pyridine-carboxylic acid-anilide the solution is heated on the oil-bath. After separation of the sodium chloride the toluene is distilled off. The residue is extracted with benzene. From the benzolic solution the amino-di-(2-ethoxy-3-pyridine-carboxylic acid-anilide) of the formula

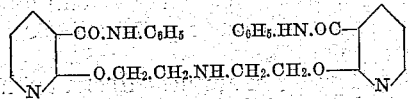

crystallizes out, forming colorless crystals of melting point 133° C.

In a similar manner there can be obtained, for instance, the following compounds:

| | Melting point |
|---|---|
| 2-dimethylaminoethoxy-3-pyridine-carboxylic-acid-anilide-monohydrochloride: colorless crystals | 204° |
| 2-di-n-butylaminoethoxy-3-pyridine-carboxylic-acid-anilide-monohydrochloride: colorless crystals | 123° |
| 2-piperidinoethoxy-3-pyridine-carboxylic-acid-anilide-monohydrochloride: colorless crystals | 198° |
| 2-diethylaminoethoxy-3-pyridine-carboxylic-acid-N-ethylanilide-monohydrochloride: colorless crystals | 142° |
| 2-diethylaminoethoxy-3-pyridine-carboxylic-acid-diethylethylenediamide-dihydrochloride: colorless crystals | 195° |
| 2-diethylaminoethoxy-3-pyridine-carboxylic-acid-diethylaminoethanolester-dihydrochloride: colorless crystals | 180° |
| 2-diethylaminoethoxy-3-pyridine-carboxylic-acid-anilide-monohydrochloride: colorless crystals | 172° |

The free base of the last compound forms a yellowish oil, insoluble in water, soluble in organic solvents and in dilute mineral acids.

What we claim is:

1. Basic ethers of the general formula

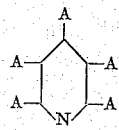

wherein one of the A's means a group of the formula

R meaning an alkylene radical containing at least two carbon atoms, and $R_1$ and $R_2$ hydrogen or alkyl, $R_1$ or $R_2$ also hydroxyalkyl, and the other A's mean hydrogen or a carboxylic amide group substituted by phenyl, alkyl or diethylaminoethyl, which products form with acids water-soluble salts, and are useful in therapeutics.

2. Basic ethers of the general formula:

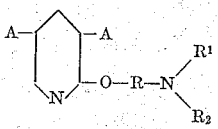

R meaning an alkylene radical containing at least two carbon atoms, and $R_1$ and $R_2$ hydrogen or alkyl, $R_1$ or $R_2$ also hydroxyalkyl, and one of the A's standing for hydrogen, and the other for hydrogen or a carboxylic amide group substituted by phenyl, alkyl or diethylamino ethyl, which products form with acids water-soluble salts, and are useful in therapeutics.

3. Basic ethers of the general formula

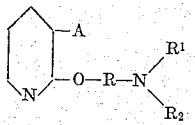

R meaning an alkylene radical containing at least two carbon atoms, and $R_1$ and $R_2$ hydrogen or alkyl, $R_1$ or $R_2$ also hydroxyalkyl, and A standing for hydrogen or a carboxylic amide group substituted by phenyl, alkyl or diethylaminoethyl, which products form with acids water-soluble salts, and are useful in therapeutics.

4. Basic ethers of the general formula

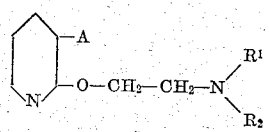

$R_1$ and $R_2$ meaning hydrogen or alkyl, $R_1$ or $R_2$ also hydroxyalkyl, and A standing for a carboxylic amide group substituted by phenyl, alkyl or diethylaminoethyl, which products form with acids water-soluble salts, and are useful in therapeutics.

5. Basic ethers of the general formula

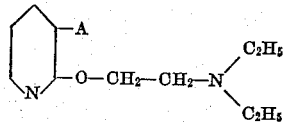

A standing for a carboxylic amide group substituted by phenyl, alkyl or diethylaminoethyl, which products form with acids water-soluble salts, and are useful in therapeutics.

6. The 2-diethylaminoethoxy-3-pyridine carboxylic acid-anilide of the formula

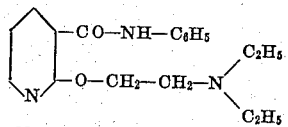

forming a yellowish oil insoluble in water, soluble in organic solvents and in dilute mineral acid, its monohydrochloride melting at 172° C., which product is useful in therapeutics or as an intermediate product.

7. The basic ethers of the general formula

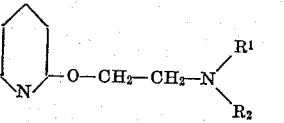

$R_1$ and $R_2$ meaning hydrogen, alkyl, or hydroxyalkyl, which products form with acids water-soluble salts, and are useful in therapeutics.

8. The 2-diethylaminoethoxy-pyridine of the formula

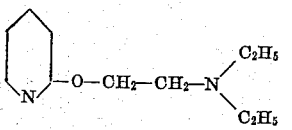

forming a colorless oil of boiling point 98–100° C. at 2 mm. pressure, sparingly soluble in water, but easily in organic solvents and acids, its mono-hydrochloride melting at 135° C., which product is useful in therapeutics or as an intermediate product.

In witness whereof we have hereunto signed our names this 18th day of July 1930.

KARL MIESCHER.
ERNEST URECH.